United States Patent [19]
Benedikter et al.

[11] Patent Number: 5,865,578
[45] Date of Patent: Feb. 2, 1999

[54] MOUNTING ASSEMBLY FOR A MACHINE-TOOL ACTUATOR

[75] Inventors: Elmar Benedikter, Bopfingen; Eugen Hangleiter, Hermaringen, both of Germany

[73] Assignee: Gunter Horst Rohm, Sontheim, Germany

[21] Appl. No.: 886,274

[22] Filed: Jul. 1, 1997

[30] Foreign Application Priority Data

Sep. 10, 1996 [DE] Germany ................. 196 36 594.5

[51] Int. Cl.⁶ ............................. B23C 5/26; B23D 3/12; B23B 31/10
[52] U.S. Cl. .................. 409/233; 408/239 R; 409/232
[58] Field of Search ................ 409/231, 232, 409/233, 234; 408/239 R, 239 A, 238

[56] References Cited

U.S. PATENT DOCUMENTS

| | | | |
|---|---|---|---|
| 4,135,848 | 1/1979 | Hughes et al. | 408/239 A |
| 4,352,612 | 10/1982 | Benatti | 409/233 |
| 4,863,324 | 9/1989 | Blessing | 409/233 |
| 5,033,922 | 7/1991 | Watanabe et al. | 409/233 |
| 5,489,167 | 2/1996 | Hangleiter | 409/233 |
| 5,549,427 | 8/1996 | Hiestand | 409/233 |

*Primary Examiner*—William R. Briggs
*Attorney, Agent, or Firm*—Herbert Dubno; Andrew Wilford

[57] ABSTRACT

A spindle assembly has inner and outer coaxial shafts having front and rear ends and extending along a common axis with the inner shaft axially displaceable in the outer shaft, a holding assembly on the front ends adapted to grip a tool or workpiece in an axially forwardly displaced position of the inner shaft relative to the outer shaft, a coupling ring fixed on the rear end of the outer shaft, and an actuator having a piston axially engageable with the rear end of the inner shaft and operable to axially shift the inner shaft in the outer shaft. In accordance with the invention complementarily interengaging formations on the actuator and the coupling ring including a groove and a projection are displaceable between a holding position axially securing the ring on the actuator and a freeing position allowing the ring to be axially separated from the actuator.

12 Claims, 6 Drawing Sheets

FIG. 2
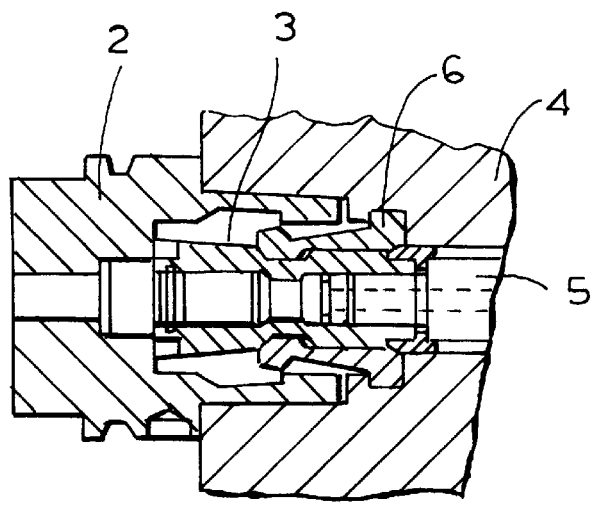
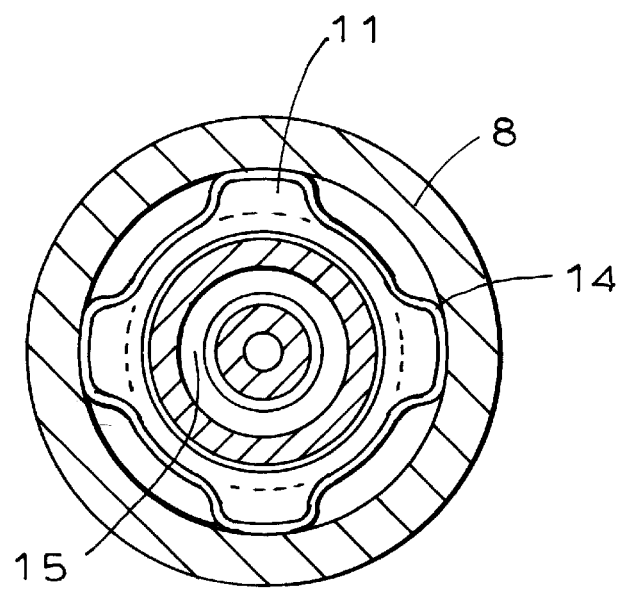
FIG. 4

MOUNTING ASSEMBLY FOR A MACHINE-TOOL ACTUATOR

FIELD OF THE INVENTION

The present invention relates to a machine-tool actuator. More particularly this invention concerns a mounting assembly for such an actuator.

BACKGROUND OF THE INVENTION

The invention relates to a spindle assembly used to rotate and hold a machine tool or workpiece. Such an assembly normally comprises inner and outer coaxial shafts having front and rear ends and extending along a common axis with the inner shaft being axially displaceable in the outer shaft, a holding assembly on the front ends adapted to grip a tool or workpiece in an axially forwardly displaced position of the inner shaft relative to the outer shaft, a coupling ring fixed on the rear end of the outer shaft, and an actuator having a piston axially engageable with the rear end of the inner shaft and operable to axially shift the inner shaft in the outer shaft.

The actuator is typically coupled to the ring by an arrangement comprising an array of two-arm levers each of whose one arm can hook into a groove on the ring. The other arm of each lever has a foot that is radially outwardly angled so as to present radial inner and outer surfaces which are parallel to each other but which extend at an acute angle to the shaft axis. The inner surfaces engage in a groove that is formed on the release device. In order to pivot the hooks out of the groove of the coupling ring there is an axially displaceable ring that can engage the outer surfaces of the levers. When the ring is moved axially back, it slides on the outer surfaces and pivots the other arms out, decoupling the ring from the actuator.

Such an arrangement is quite complex and must be specially constructed so as not to open when the spindle assembly is rotated at high speed.

OBJECTS OF THE INVENTION

It is therefore an object of the present invention to provide an improved coupling arrangement for a spindle assembly.

Another object is the provision of such an improved coupling arrangement for a spindle assembly which overcomes the above-given disadvantages, that is which is of simple construction, yet which solidly connects the spindle to the actuator.

SUMMARY OF THE INVENTION

A spindle assembly has according to the invention inner and outer coaxial shafts having front and rear ends and extending along a common axis with the inner shaft axially displaceable in the outer shaft, a holding assembly on the front ends adapted to grip a tool or workpiece in an axially forwardly displaced position of the inner shaft relative to the outer shaft, a coupling ring fixed on the rear end of the outer shaft, and an actuator having a piston axially engageable with the rear end of the inner shaft and operable to axially shift the inner shaft in the outer shaft. In accordance with the invention complementarily interengaging formations on the actuator and the coupling ring including a groove and a projection are displaceable between a holding position axially securing the ring on the actuator and a freeing position allowing the ring to be axially separated from the actuator.

Thus the coupling and actuator fit together like a lock and key or a lock and bolt, in effect coded to each other. In one angular position the two can be engaged together and then locked, and in another position they can be separated.

More particularly according to the invention the groove is formed in the actuator and opens radially inward and the projections are radially outwardly projecting lugs on the ring. The actuator is formed at the groove with a plurality of cutouts though which the lugs can pass axially in the freeing position. The lugs and cutouts are substantially complementary and are angularly spaced, normally equispaced, about the axis. The lugs in accordance with the invention are arranged in pairs centered diametrically across from each other on opposite sides of the axis.

According to another feature of the invention the groove is formed in the ring and opens radially outward. The actuator is provided with a plurality of pawls rotatable about respective pawl axes parallel to the main axis between outer positions clear of the groove and inner positions engaging radially inward into the groove. The actuator is formed axially aligned with each pawl with an axially open hole and each pawl is formed with a tool-receiving recess aligned with the respective hole so that a tool can be inserted into each recess through the respective hole to turn the respective pawl.

Each pawl includes according to the invention a pawl part engageable in the groove and a pin extending along the respective axis and axially displaceable relative to the pawl. The pins each carry a radial projection and the actuator is formed in each of the holes with a radially inwardly open recess in which the respective projection is receivable only in the holding position. The pins are each movable axially between a locked position with the radial projections in the recesses and an unlocked position with the radial projections clear of the recesses. Respective springs are braced axially between the pins and the actuator and urging the pins into the locked positions. The pawls are angularly spaced about the shaft axis.

BRIEF DESCRIPTION OF THE DRAWING

The above and other objects, features, and advantages will become more readily apparent from the following description, reference being made to the accompanying drawing in which:

FIG. 2 is a view of a detail of the actuator of FIG. 1 in the freeing position;

FIG. 4 is a section taken along line IV—IV of FIG. 3;

SPECIFIC DESCRIPTION

Figure 1:
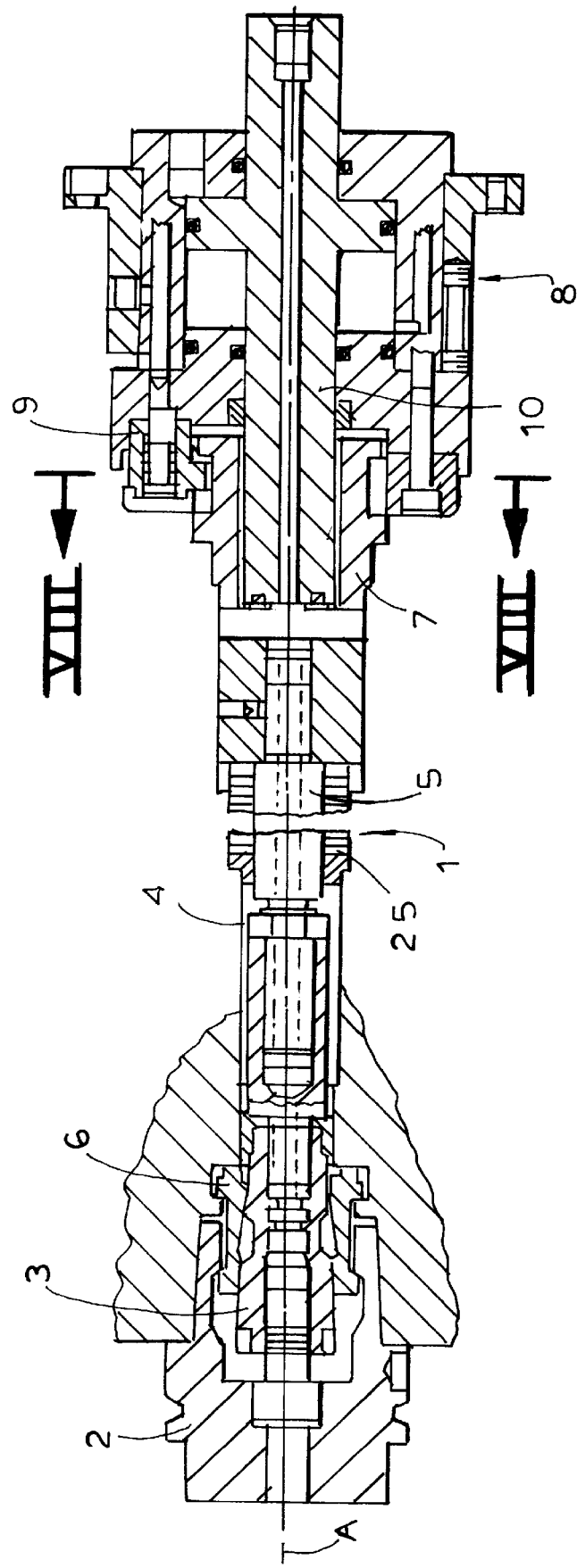
FIG. 1 is a partly diagrammatic axial section through a machine-tool actuator having a mounting assembly according to the instant invention in the holding position.

As seen in FIGS. 1 and 2 a spindle assembly 1 is formed basically by an outer tube shaft 4 centered on and rotatable about an axis A an a central rod 5 coaxially received in the shaft 4 and axially displaceable therein. This rod 5 has a front end carrying a cone 3 that can operate a plurality of jaws 6 and is urged axially backward (toward the right in FIG. 1) by a stack 25 of spring washers. An actuator housing 8 having a double-acting piston 10 is mounted on the coupling ring 7 and can engage the rod 5 to push it against the force of the springs 25. Normally the rod 5 is pulled back by the springs 25 as shown in FIG. 1 so that its jaws 6 are spread to retain a tool or workpiece 2 on the outer shaft 4. When pressed forward by the actuator 8 as shown in FIG. 2, these jaws 6 swing in and the end of the rod 5 pushes out the tool or workpiece 2 to free it from the shaft 4. This is all standard.

Figure 3:
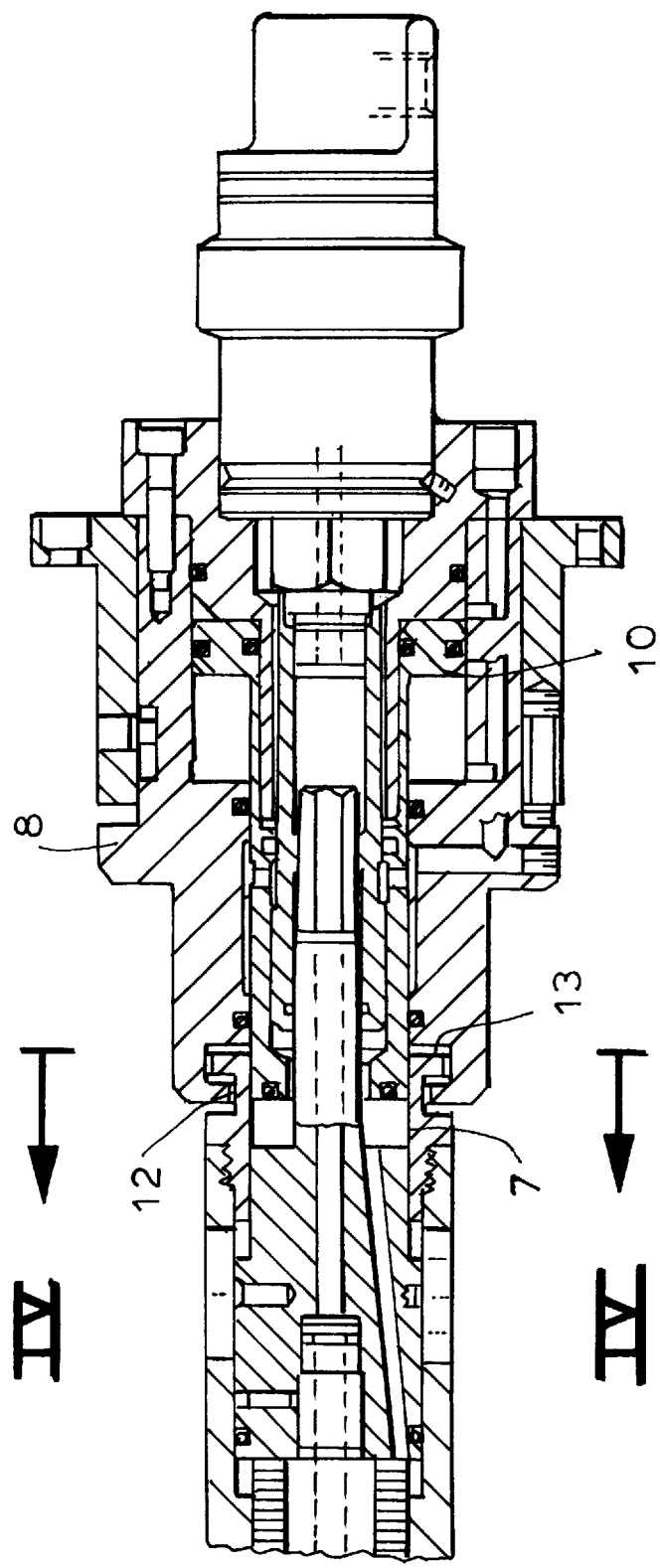
FIG. 3 is an axial section through another mounting assembly in accordance with the invention.
Figure 5:
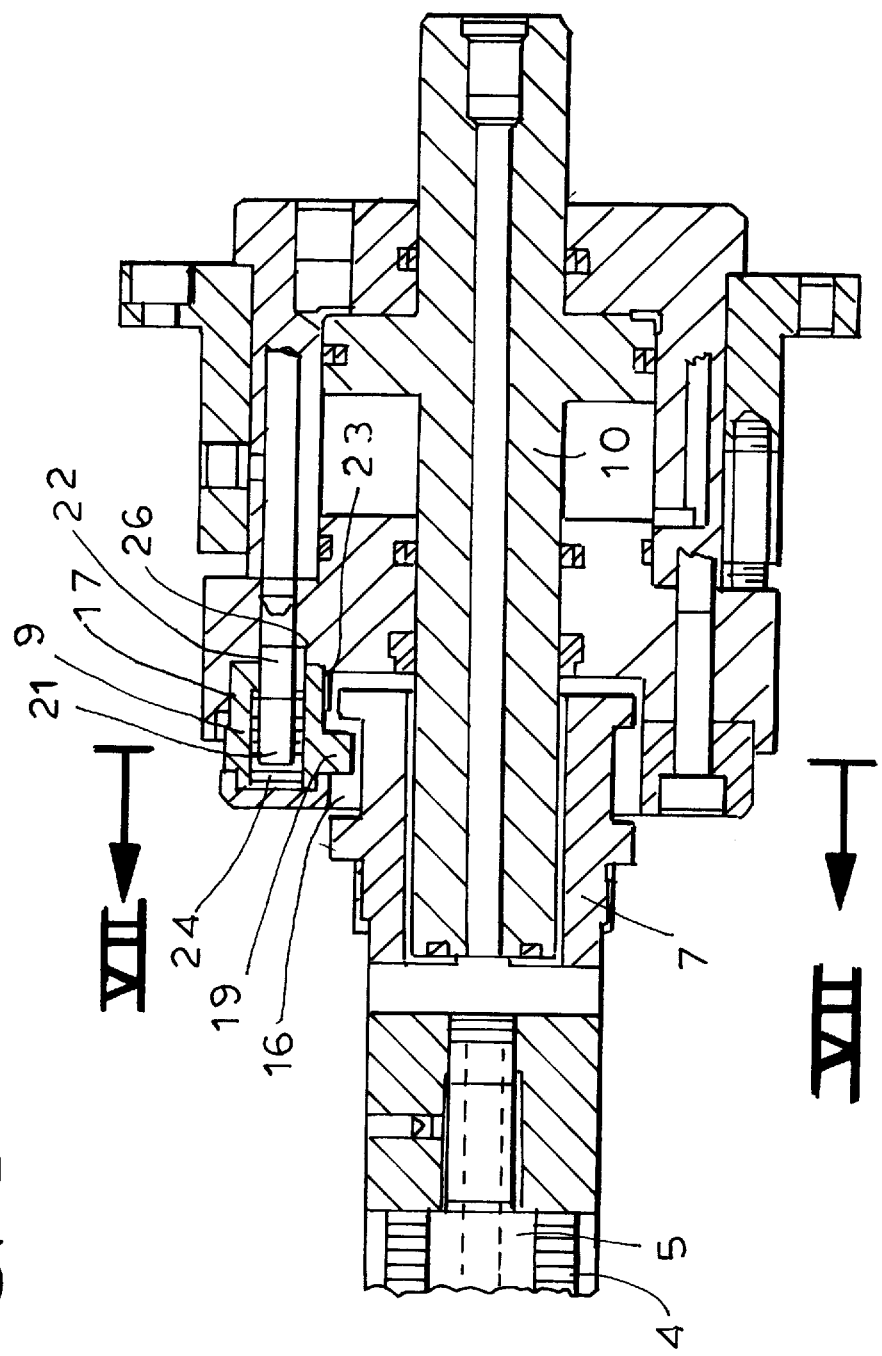
FIG. 5 is a large-scale view of a detail of FIG. 1 in the locked position.
Figure 6:
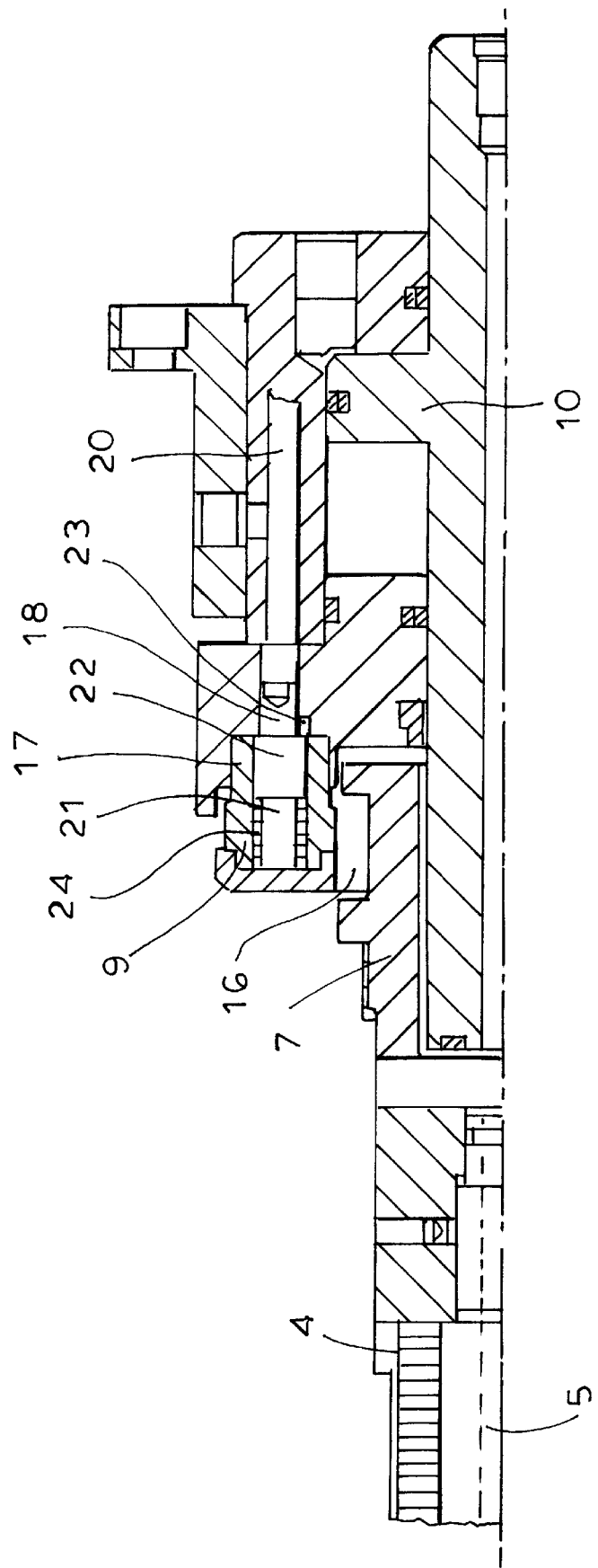
FIG. 6 is a partial view of a detail of FIG. 5 but in the unlocked position.

In the embodiment of FIGS. 3 and 4 the coupling ring 7 is formed like a key with four radially outwardly projecting lugs 11 and is received in a lock-like seat 12 formed centered on the axis A in the actuator 8. This seat 12 is formed with a radially inwardly open groove 13 and the actuator 8 is formed with notches or cutouts 14 complementary to the tabs 11 which are centered on two perpendicular diameters 15. Thus the ring 7 can be inserted axially into the seat, with the lugs 11 passing through the cutouts 14, and then rotated about the axis through about 45° to lock the ring 7 axially to the actuator 8, like a keeper in a lock. Stops can be provided to define an end position of the ring 7 in the groove 13.

In the arrangement of FIGS. 1, 2, and 5 through 8 a more complex coupling arrangement 9 is provided. Here four pawls 17 are mounted on pins 18 and have projecting noses 19 that can engage in a radially outwardly open groove 16 formed in the coupling ring 7. These pins 18 are coupled angularly relative to the respective axes 21 to the respective pawls 17 but are axially displaceable relative thereto, normally with a simple sliding-key system or by forming the pawls with noncircular holes into which noncircular-section pins 18 fit. In addition each pin 18 is formed with a radially projecting lug 22 that can fit in a complementary seat 23 of the actuator 8, and springs 24 urge the pins 18 axially backward. The rear ends of the pins 18 are formed with hex seats 26 and the actuator 8 is formed with passages 20 aligned axially with the pins 18 so that a hex wrench can be inserted into these seats 26.

Figure 7:
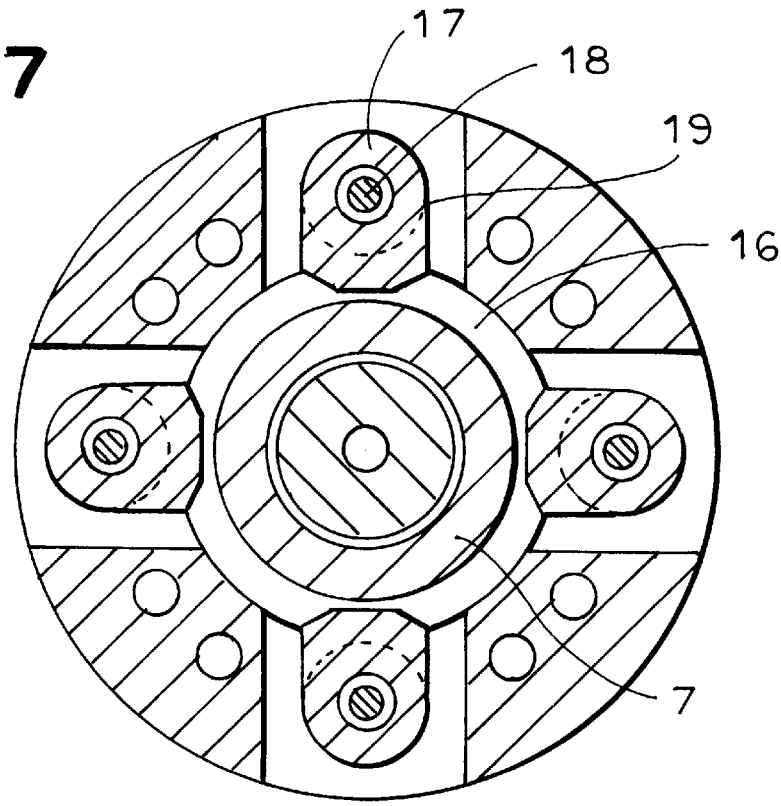
FIG. 7 is a section taken along line VII—VII of FIG. 5.

The lugs 22 only fit into the seats 23 when the noses 19 of the pawls 17 are in the inner position shown in FIG. 7, that is engaging into the groove 16. In this position they solidly secure the coupling ring 7 to the actuator 8.

Figure 8:
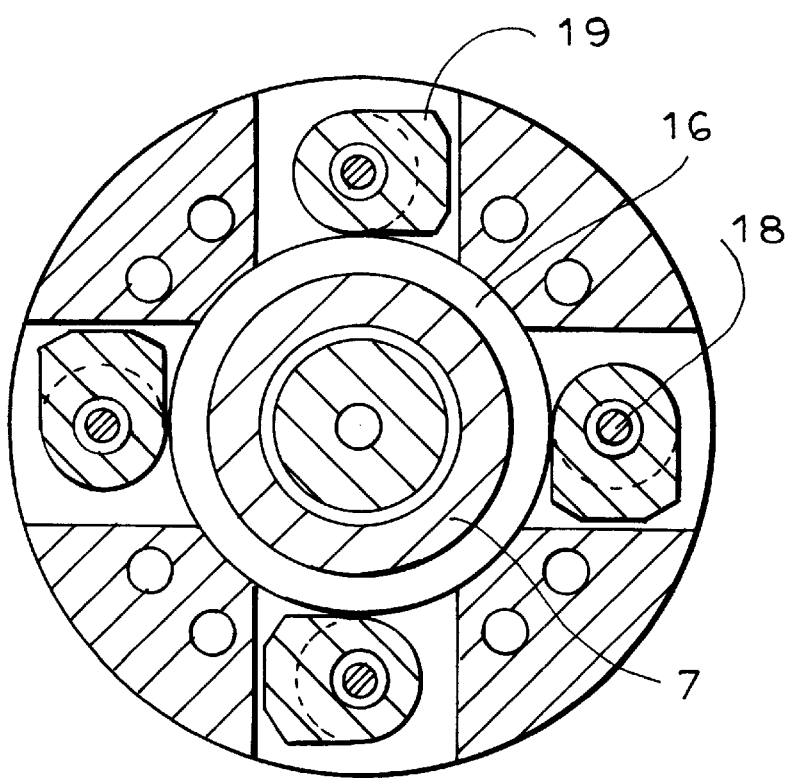
FIG. 8 is a view like FIG. 7 but in the unlocked position.

To release the ring 7 from the actuator 8, a hex key is inserted into each of the holes 20 and fitted to the respective seat 27. The rod 18 is pushed forward against the force of the springs 24 to move the projection 22 out of the seat 23, allowing the pin 18 to be turned to lift the nose 19 out of the groove 16 as shown in FIG. 8. Once all the pawls 17 are moved in to this outer position, the ring 7 can be pulled forward out of the actuator 8.

We claim:

1. A spindle assembly comprising:
   inner and outer coaxial shafts having front and rear ends and extending along a common axis, the inner shaft being axially displaceable in the outer shaft;
   a holding assembly on the front ends adapted to grip a tool or workpiece in an axially forwardly displaced position of the inner shaft relative to the outer shaft;
   a coupling ring fixed on the rear end of the outer shaft;
   an actuator having a piston axially engageable with the rear end of the inner shaft and operable to axially shift the inner shaft in the outer shaft; and
   complementarily interengaging formations on the actuator and the coupling ring including a groove and a projection and displaceable between a holding position axially securing the ring on the actuator and a freeing position allowing the ring to be axially separated from the actuator.

2. The spindle assembly defined in claim 1 wherein the groove is formed in the actuator and opens radially inward and the projections are radially outwardly projecting lugs on the ring, the actuator being formed at the groove with a plurality of cutouts though which the lugs can pass axially in the freeing position.

3. The spindle assembly defined in claim 2 wherein the lugs and cutouts are substantially complementary and are angularly spaced about the axis.

4. The spindle assembly defined in claim 3 wherein the lugs and cutouts are angularly equispaced about the axis.

5. The spindle assembly defined in claim 4 wherein the lugs are arranged in pairs centered diametrically across from each other on opposite sides of the axis.

6. The spindle assembly defined in claim 1 wherein the groove is formed in the ring and opens radially outward, the actuator being provided with a plurality of pawls rotatable about respective pawl axes parallel to the main axis between outer positions clear of the groove and inner positions engaging radially inward into the groove.

7. The spindle assembly defined in claim 6 wherein the actuator is formed axially aligned with each pawl with an axially open hole and each pawl is formed with a tool-receiving recess aligned with the respective hole, whereby a tool can be inserted into each recess through the respective hole to turn the respective pawl.

8. The spindle assembly defined in claim 6 wherein each pawl includes a pawl part engageable in the groove and a pin extending along the respective axis and axially displaceable relative to the respective pawl, the pins each carrying a radial projection and the actuator being formed in each of the holes with a radially inwardly open recess in which the respective projection is receivable only in the holding position, the pins each being movable axially between a locked position with the radial projections in the recesses and an unlocked position with the radial projections clear of the recesses.

9. The spindle assembly defined in claim 8, further comprising
   respective springs braced axially between the pins and the actuator and urging the pins into the locked positions.

10. The spindle assembly defined in claim 7 wherein the pawls are angularly spaced about the shaft axis.

11. A spindle assembly comprising:
    inner and outer coaxial shafts having front and rear ends and extending along a common axis, inner shaft being axially displaceable in the outer shaft;
    a holding assembly on the front ends adapted to grip a tool or workpiece in an axially forwardly displaced position of the inner shaft relative to the outer shaft;
    a coupling ring fixed on the rear end of the outer shaft and formed with a plurality of radially outwardly projecting lugs; and
    an actuator having a piston axially engageable with the rear end of the inner shaft and operable to axially shift the inner shaft in the outer shaft, the actuator being formed with a radially inwardly open groove and with a plurality of radially inwardly open cutouts through which the lugs are axially movable in a freeing position of the ring relative to the actuator, the ring being rotatable about the axis relative to the actuator from the freeing position into a holding position with the lugs angularly offset from the cutouts and the ring locked axially to the actuator.

12. A spindle assembly comprising:

inner and outer coaxial shafts having front and rear ends and extending along a common axis, inner shaft being axially displaceable in the outer shaft;

a holding assembly on the front ends adapted to grip a tool or workpiece in an axially forwardly displaced position of the inner shaft relative to the outer shaft;

a coupling ring fixed on the rear end of the outer shaft and formed with a radially outwardly open groove;

an actuator having a piston axially engageable with the rear end of the inner shaft and operable to axially shift the inner shaft in the outer shaft; and a plurality of pawls pivotal on the actuator between inner positions engaged in the groove and axially locking the ring to the actuator and outer positions clear of the groove and allowing the ring to be separated axially from the actuator.

* * * * *